United States Patent [19]
Jaeschke

[11] 3,845,337
[45] Oct. 29, 1974

[54] ELECTROMAGNETIC COUPLING HAVING AN END MOUNTED FIELD

[75] Inventor: Ralph L. Jaeschke, Kenosha, Wis.

[73] Assignee: Eaton Corporation, Cleveland, Ohio

[22] Filed: Dec. 22, 1972

[21] Appl. No.: 317,552

[52] U.S. Cl. .............................. 310/105, 310/62
[51] Int. Cl. ......................................... H02k 49/02
[58] Field of Search ...................... 310/98–105, 310/58–65

[56] References Cited
UNITED STATES PATENTS

| | | | |
|---|---|---|---|
| 3,047,754 | 7/1962 | Jaeschke | 310/105 |
| 3,089,971 | 5/1963 | Wheeler et al. | 310/105 |
| 3,167,674 | 1/1965 | Woodward, Jr. | 310/105 |
| 3,267,309 | 8/1966 | Cohen et al. | 310/98 |
| 3,549,921 | 12/1970 | Halstead et al. | 310/98 X |

*Primary Examiner*—D. F. Duggan
*Attorney, Agent, or Firm*—Teagno & Toddy

[57] ABSTRACT

An electromagnetic coupling includes a field coil assembly disposed on an interior portion of an end cover of a housing proximately to an inductor drum and rotor to electromagnetically couple the drum and rotor thereby allowing the rotor to turn in response to rotation of the drum. The field coil is mounted to allow heat generated by the field coil to be dissipated by conduction from the field coil through the end cover to an exterior portion of the housing.

10 Claims, 2 Drawing Figures

PATENTED OCT 29 1974   3,845,337

3,845,337

ELECTROMAGNETIC COUPLING HAVING AN END MOUNTED FIELD

BACKGROUND OF THE INVENTION

1. Field of the Invention

This invention relates to electromagnetic couplings generally and more particularly to eddy-current couplings wherein the strength of the electromagnetic field is used to control the speed of a loaded output shaft.

2. Description of the Prior Art

Heretofore, known electromagnetic coupling devices utilized coupling assemblies wherein the field coil was mounted between an outer drum and an inner rotor. The coil thus depended upon air movement or the flow of a conventional cooling fluid through the housing of the coupling member to cool the coil to acceptable heat rise limits. Such a field coil arrangement is disclosed in U.S. Pat. No. Re. 27,337 issued to Ralph L. Jaeschke and entitled "Eddy Current Coupling." Such an arrangement even though acceptable requires sufficient air or fluid flow to draw off the heat generated by the field coil. Moreover, since a separate support member is provided to support the field member the size and cost of the coupling is increased. This results in an enlarged coupling which is both bulky, and expensive.

SUMMARY OF THE INVENTION

The present invention solves the prior mentioned problems and others by providing an electromagnetic coupling which combines the end cover and the magnetic field in one assembly and is, therefore, shorter in length, less expensive and which provides for greater heat dissipation from the field coil of the coupling than the known prior art electromagnetic couplings.

To this end, a housing having an end cover encloses a motor which drives an eddy current drum around a rotor assembly to which is affixed an output shaft concentrically oriented with the motor shaft and extending from the housing. A field coil assembly is mounted directly to the end cover of the housing proximately to the drum and rotor to electromagnetically couple the rotor assembly to the drum assembly and thereby effect rotation of the rotor in response to the rotation of the drum and energization of the field coil assembly.

The mounting of the field coil assembly directly to the end cover of the housing eliminates the spacings normally required to provide cooling air or fluid flow to the coil assembly and makes for a shorter more compact housing by having the end cover also serve as a support member for the field coil assembly. Thus, since a separate field support member is not needed, the new coupling is also less expensive to manufacture. Adequate cooling of the field coil is provided by direct heat conduction of the heat generated by the field coil to the end cover and therefrom to the exterior of the housing which allows the generated heat to be dissipated to the ambient air by the large surface area of the end cover and housing.

Accordingly, an object of this invention is to provide a shorter, more compact, and less expensive electromagnetic coupling by eliminating excess space and providing a dual function housing end cover which supports the field member of the coupling.

Another object of the present invention is to provide a field coil assembly which is in direct heat conduction relationship with the end cover and housing of the electromagnetic coupling to allow heat generated by the field coil assembly to be easily dissipated.

Yet another object of the present invention is to provide an electromagnetic coupling assembly which is cooled by induced air flow through the housing of the assembly and heat conduction from the field coil to the end cover.

These and other objects of the present invention will become more apparent from the description of the invention and drawings which follow.

DESCRIPTION OF THE PREFERRED EMBODIMENT

Figure 1:
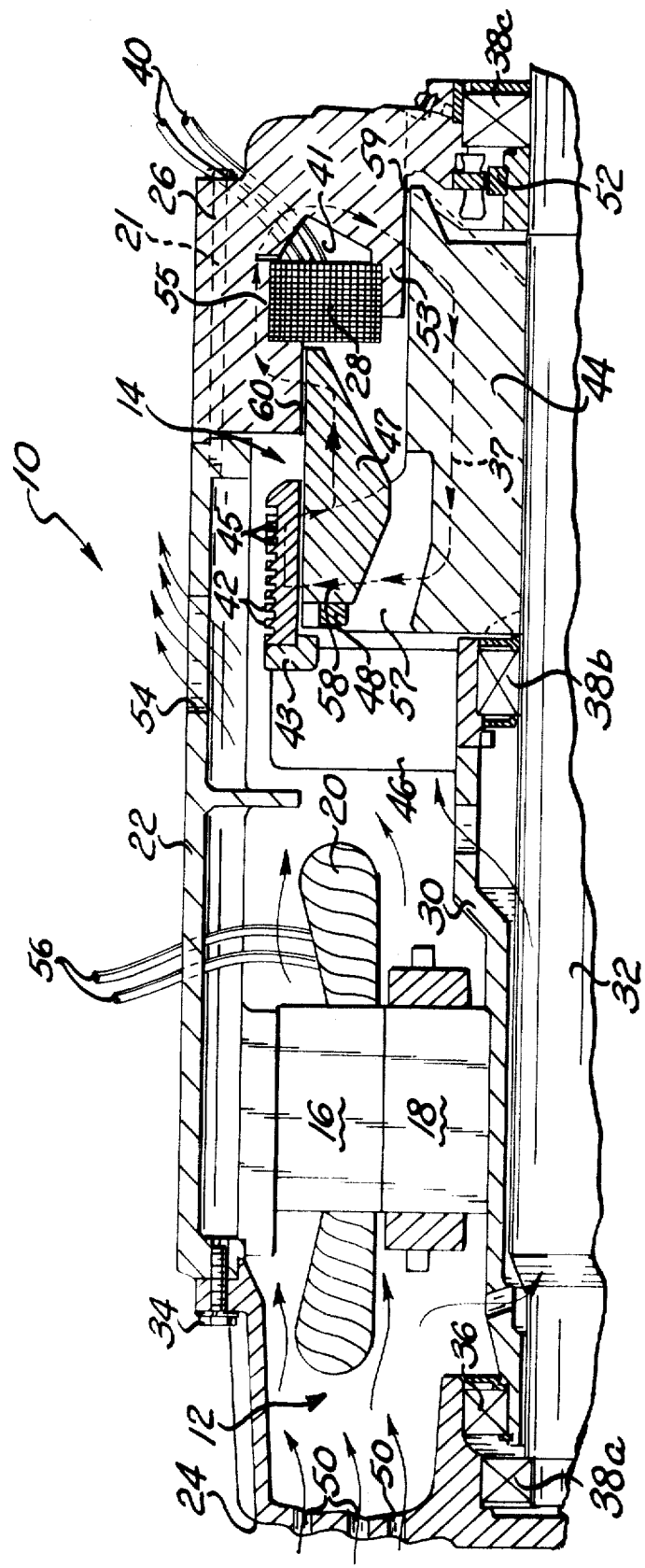
FIG. 1 is a sectional side view of the upper half of an electromagnetic eddy-current coupling.

Referring now to the drawings wherein the showing is for purposes of explaining the preferred embodiment of the invention and not for purposes of limiting same, an electromagnetic eddy-current coupling 10 has a housing 22 with a motor end cover 24 fastened to the housing 22 by a retaining screw 34. The opposite end of the housing 22 has a coupling end cover 26 fastened to the housing 22 by a retaining screw 21 or any other means known to those skilled in the art.

A motor assembly 12 is mounted at one end of the housing 22 and includes a stator 16 having a winding 20 and a rotor 18 fixed to a motor quill shaft 30. Power connections 56 to the stator of motor 12 energize the field 20 and drive the rotor 18 and the shaft 30 affixed thereto at a predetermined speed in a well known manner in response to energization of the stator of motor 12. The quill shaft 30 is supported at one end by a bearing assembly 36 and at the opposite end by a bearing assembly 38b to assure friction-free aligned rotation of the quill shaft 30.

The quill shaft 30 has a plurality of impellers 46 attached thereto which are mounted at one end of the shaft 30 with a circumferential ring 43 affixed to their extremities to which an inductor drum 42 is affixed. The inductor drum 42 forms part of an eddy current coupling 14 disposed within the housing 22. The impellers 46 rotate with shaft 30 and direct a flow of air through coupling 14 to effect cooling thereof. The inductor drum 42 has a plurality of grooves 45 disposed on the outer surface thereof which aid in cooling of the drum 42 during operation of the coupling 10 as is best described in U.S. Pat. No. 3,641,375 issued to William H. Moyer.

The coupling assembly 14 includes a rotor 44 affixed to an output shaft 32. The output shaft 32 extends the length of the housing 22 and is disposed coaxially with the motor quill shaft 30. The output shaft 32 is supported at the motor end of the housing 22 by a bearing assembly 38a, at the middle portion of the housing by the bearing assembly 38b and at the coupling end of the housing by a bearing assembly 38c. The output shaft 32 extends through the end cover 26 and is coupled to a load (not shown) in a well known manner. The rotor 44 includes a plurality of toothed poles 57 which are connected to a plurality of pole members 58 by a nonmagnetic stainless steel support ring 48 which magnetically isolates pole members 57 from pole members 58 as described in U.S. Pat. No. Re. 27,337.

Figure 2:
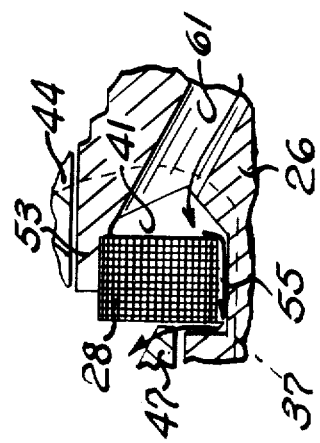
FIG. 2 is a sectional side view of the lower half of the end cover of the coupling of FIG. 1.

A field coil 28 is provided for coupling the inductor drum 42 and the rotor 44 upon energization of the coil 28 through the pair of lead wires 40. The coil 28 is supported by the coupling end cover 26 which is in magnetic relationship with an end 47 of the pole member 58 and the hub member 44 through parasitic gaps 60, 59. The coil 28 is also in heat conductive relationship with the end cover 26 and therethrough with the housing 22. To this end the end cover 26 includes a cylindrical air cooling cavity 41 therein which is defined by spaced apart annular shoulder portions 53 and 55. As may be seen with reference to FIG. 2, the lower portion of the end cover 26 has a passageway 61 formed therein to allow air flow to the cavity 41. The annular shoulders 53 and 55 are disposed concentric to one another and provide support surfaces upon which the coil 28 is supported by the end cover 26. This particular mounting arrangement allows the coil 28 to operate within acceptable heat rise ranges by conducting the heat generated by the field coil to the end cover 26 and therefrom to the housing 22 which provide a large heat transfer area to the atmosphere for dissipating the heat generated by the coil 28. Furthermore, cooling air is induced to the cavity 41 through passageway 61 by the action of the impellers 46 to further cool the coil 28 as well as the coupling 14. As will be readily understood, the end cover 26 is manufactured from a material having a high heat conductivity coefficient such as magnetic ingot iron with good magnetic characteristics. Moreover, the mounting of the field member 28 directly on the end cover 26 substantially reduces the length of the housing 22 over devices known in the art due to the fact that a separate field support member is not needed. The shortening of the overall length of the coupling is critical in areas where the bulk of the coupling is important. Thus, the present coupling will fit in places where prior art couplings will not. Furthermore, the elimination of a separate field support member reduces the cost of the coupling.

The internal components contained within the housing 22 are maintained within acceptable heat rise ranges by induced air flow originating at air inlet passages 50 and passageway 61 and exiting from an air outlet 54. This air flow is induced by rotation of the impellers 46 which draw air from the inlets 50, over the motor 12, to the coupling assembly 14, and therefrom out of the outlet 54. Similarly air is drawn through the passageway 61, to the cavity 41, over the coil 28, over the coupling 14 and therefrom out of the outlet 54.

In operation, the motor 12 is rotated at a predetermined constant speed causing the quill shaft 30 to rotate the drum 42. A predetermined direct current is applied to the coil 28 through input lines 40 and an electromagnetic field having a flux path 37 magnetically couples the drum 42 and the rotor 44. The flux path extends around the coil 28 through the end cover 26, crosses the parasitic gap 59 into the rotor 44, continues along the rotor 44 and goes into a pole member 57. From there it crosses an air gap and goes into the drum 42, crosses an air gap and goes into the pole member 58 and goes from the end 47 of the pole member 58 across the parasitic gap 60 into the end cover 26 to complete the path 37. As the drum 42 rotates through this field the lines of flux 37 are broken and cause the rotor 44 and the output shaft 32 to which it is affixed to rotate in a proportional relationship with the rotation of the drum 42. The speed of the output shaft 32 will be dependent upon the input speed of shaft 32 and the magnitude of the current flow through coil 28. Since there is some slip, the output shaft 32 will rotate at a lower speed than the drum 42. The amount of slippage and, therefore, the speed of the output shaft 32 is controlled by the strength of the field produced by the field coil 28 which is dependent upon the current supplied the field coil 28. Hence the output shaft speed may be varied by varying the current to the coil 28.

The present coupling may be utilized to provide a certain speed output. If this is desired, a stator 52 is mounted proximately to the inner rotor 44 and functions as a speed tachometer to monitor the output shaft rotation. The signal from the stator 52 may be directed to a control (not shown) and compared therein with a reference signal indicative of desired output shaft 32 rotation. Any deviation from this reference results in an error signal which appropriately changes the current to the field coil 28 and consequently the speed of the output shaft until a zero error signal is obtained from the control.

It will be appreciated that the eddy-current coupling 10 could be operated in reverse with the output shaft 32 being driven and the motor shaft 30 then operating as the electromagnetically coupled shaft driven therefrom.

Certain modifications and improvements will become obvious to those skilled in the art upon reading this specification. It is intended that all such modifications and improvements be included in the scope of this application and it not be limited thereby.

What I claim as new and desire to secure by Letters Patent of the United States is:

1. An electromagnetic coupling comprising a longitudinally extending housing, a single piece end section member for enclosing an end of said housing including a first portion having a substantially cylindrical configuration and longitudinally extending with said longitudinally extending housing and having an end portion disposed substantially perpendicularly to said first portion, means for connecting said first portion of said end section to one end of said longitudinally extending housing to establish a contiguous relation therebetween, a motor inside said housing, an eddy current drum rotatable by said motor, a load output shaft extending through said end section of said housing, a rotor assembly affixed to said load output shaft to rotate therewith, a field coil assembly mounted proximately to said rotor assembly and said eddy current drum to electromagnetically couple said drum and said rotor assembly by establishing a flux path from said field coil assembly through said end section, through said rotor assembly, through said eddy current drum, through said rotor assembly and through said end section to said field coil assembly, said field coil assembly when energized providing rotation of said load output shaft in response to rotation of said eddy current drum, said end section of said housing having formed therein a pair of annular spaced apart shoulder portions extending substantially parallel with said longitudinal housing to form an annular cavity in said end section, and said annular shoulder portions supporting said field coil assembly in said annular cavity with said field coil assembly being mounted directly to said end section of said housing.

2. An electromagnetic coupling as set forth in claim 1 wherein said end section is formed to provide an air inlet passage to said annular cavity for providing an air flow path for cooling said field coil assembly of said coupling.

3. An electromagnetic coupling as set forth in claim 2 including an impeller mounted to the shaft of said rotor to induce air flow through the air inlet of said end cover to dissipate the heat generated in the annular cavity of said end section by said field coil assembly.

4. An electromagnetic coupling as set forth in claim 3 wherein said end section is formed from a permeable magnetic material having a high heat conductivity.

5. An electromagnetic coupling comprising longitudinally extending housing having a longitudinal axis, a rotatable eddy current drum mounted inside said housing, a load output shaft, a rotor assembly affixed to said load output shaft to be rotatable therewith, an annular field coil assembly mounted proximately to said rotor assembly and said eddy current drum to electromagnetically couple said drum and said rotor, and an end section for enclosing one end of said housing, said end section having a first portion extending substantially parallel to said longitudinal axis of said housing, a second portion extending from one end of said first portion to be substantially perpendicular to said longitudinal axis of said housing, a third portion extending from the other end of said first portion to be substantially perpendicular to said longitudinal axis of said housing, said first, second and third portions cooperating to form an annular cavity for supporting said field coil assembly therein, said first, second and third portions cooperating to support said annular field coil assembly in said annular cavity in a relationship with said rotor assembly and said eddy current drum whereby energization of said field coil assembly electromagnetically couples said drum and said rotor assembly to provide rotation of said rotor assembly in response to rotation of said drum, and a passageway extending through said second portion of said end section to the annular cavity formed in said end section for cooling said coil assembly mounted therein.

6. An electromagnetic coupling as set forth in claim 5 wherein said first portion of said end section is in heat conduction relationship with said housing through said third portion of said end section.

7. An electromagnetic coupling as set forth in claim 5 wherein said end section is directly mounted to said housing to allow heat conduction between said end section and said housing.

8. An electromagnetic coupling comprising a longitudinally extending housing having a longitudinal axis, a rotatable eddy current drum mounted inside said housing, a load output shaft, a rotor assembly affixed to said load output shaft to be rotatable therewith, an annular field coil assembly mounted proximately to said rotor assembly and said eddy current drum to electromagnetically couple said drum and said rotor, and an end section for enclosing one end of said housing, said end section having a first portion extending substantially parallel to said longitudinal axis of said housing, a second portion extending from one end of said first portion to be substantially perpendicular to said longitudinal axis of said housing, a third portion extending from the other end of said first portion to be substantially perpendicular to said longitudinal axis of said housing, said first, second and third portions cooperating to form an annular cavity for supporting said field coil assembly therein, said first, second and third portions cooperating to support said annular field coil assembly in said annular cavity in a relationship with said rotor assembly and said eddy current drum whereby energization of said field coil assembly electromagnetically couples said drum and said rotor assembly to provide rotation of said rotor assembly in response to rotation of said drum and wherein said end section further includes a fourth portion substantailly parallel to said first portion but spaced therefrom, said fourth portion cooperating with said first, second and third portions to define said annular cavity, said first, second, third and fourth portions cooperating with said field coil assembly to establish a flux path therethrough from said field coil assembly to electromagnetically couple said rotor and drum when said field coil assembly is energized.

9. An electromagnetic coupling as set forth in claim 8 wherein said eddy current drum and said third portion of said end section extend over said rotor assembly in close proximity therewith to establish a flux path through said rotor assembly, said eddy current drum, and said end section.

10. An electromagnetic coupling as set forth in claim 9 wherein said flux path is established around said end section, said rotor assembly, and said drum by flux lines extending from said fourth portion of said end section to said rotor assembly, therefrom to said drum and then back to said rotor assembly and therefrom to said third portion of said end section to extend back to said fourth portion by way of said first and second portions.

* * * * *